United States Patent Office 3,391,917
Patented July 9, 1968

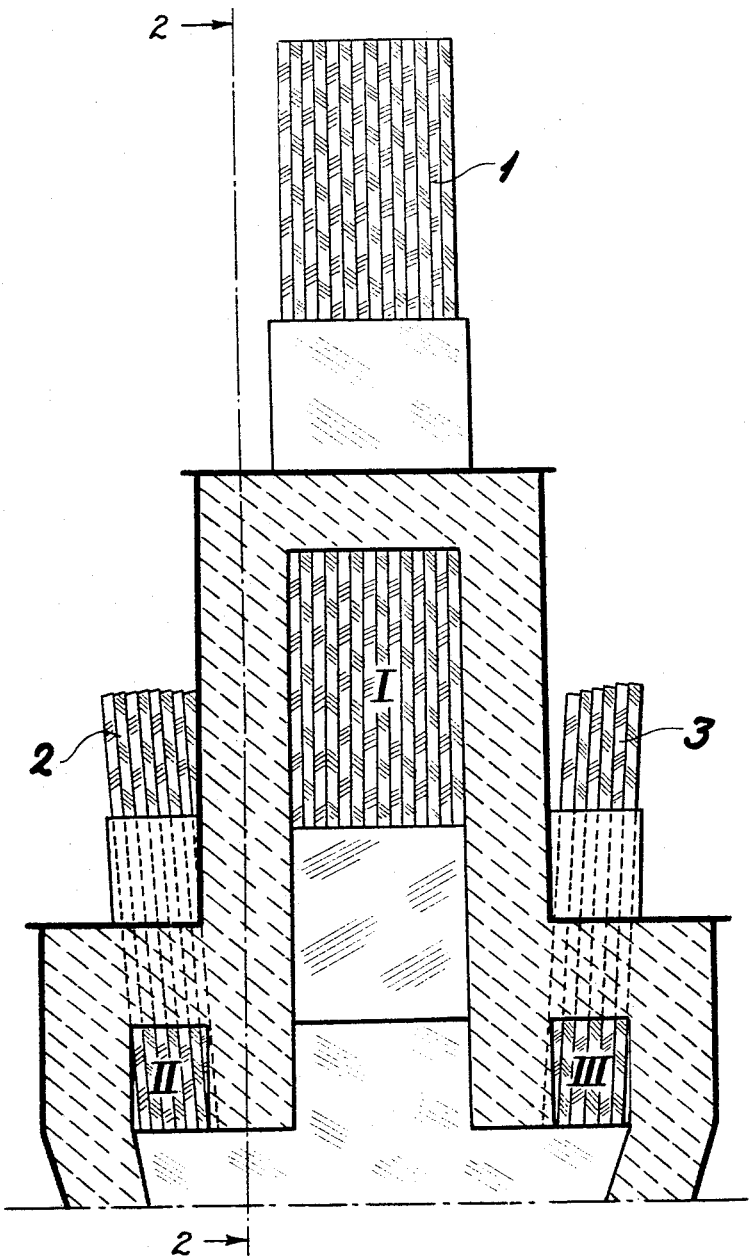

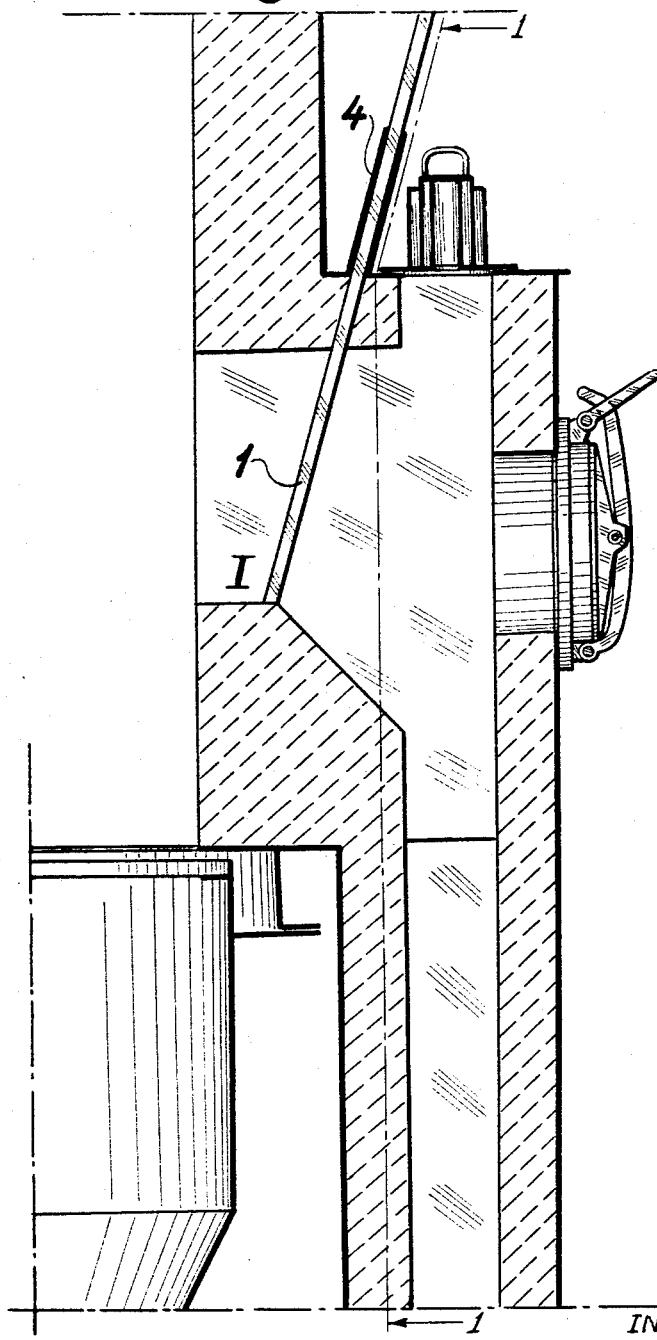

3,391,917
REGULATING DEVICE FOR THE REMOVAL OF SOLID MATERIALS FROM THE REACTION CHAMBER OF A FLUIDIZED BED FURNACE
Osmo O. E. Vartiainen, Kokkola, Finland, assignor to Outokumpu Osakeyhito, Helsinki, Finland, a corporation of Finland
Filed Sept. 8, 1965, Ser. No. 485,852
Claims priority, application Finland, Sept. 9, 1964, 1,919/64
2 Claims. (Cl. 266—20)

ABSTRACT OF THE DISCLOSURE

A fluidized bed furnace having walls with openings therethrough, at least one of said openings having a passage with a generally horizontal portion, at least one of such openings being provided with an improved closure member which permits the opening to be closed to a desired degree while keeping the effective height of the passage constant. The closure member is composed of a plurality of generally vertical separate parallel bars lying close to each other in a row; the bars are separately movable in the plane of the closure member, the effective area of the passage through the wall of the furnace at said opening is varied by raising one or more bars out of alignment with the opening.

---

It is generally difficult to remove solid material from a reaction chamber in which they are in constant movement with air or some other gas, because the quantity of the material or the loss of pressure it causes must be kept constant at every moment.

In most cases the material must be removed in such a way that the gases created by the reaction do not escape with it.

One example of such a process is the roasting of iron sulphide (FeS-matte), in which the bulk of the iron oxide produced has to be removed from the reaction chamber. This must be done continuously so as to keep the reaction time and other factors affecting the reaction constant. The same applies to all other roasting processes performed in fluidized bed furnaces, including sulphation.

The continuous, even removal of materials from the reaction is greatly hindered by a tendency for outlets to get clogged up owing to the high temperature and the properties of the products yielded, thus causing changes in the quantity of materials removed. The effect of such changes on the reaction conditions is to alter the pressure, and thus also the temperature. This is a considerable disadvantage, particularly in the roasting of iron sulphide (FeS-matte), which process calls for a very even temperature only a few degrees (° C.) below the softening point of iron sulphide.

The methods of removing solid materials from the reaction chamber most commonly used up to now include:

(a) A system of shutters moving either horizontally or vertically. The quantity of materials removed is regulated by varying the free surface area of the outlet channel.

(b) A system of cocks, which are either throttled or kept fully open. In the latter case, they can be combined with a screw conveyor device, the speed of which regulates the amount of material left in the reaction chamber.

(c) A regulating device based on the height of an overflow pipe. Regulation can be effected either by raising the height of an overflow pipe or wall of a material that withstands the temperatures involved, or by adjusting the height of the overflow pipe from outside with the aid of a special raising and lowering device.

With regulating devices based on the overflow system, it is impossible to avoid a concentration of the coarser reaction products in the reaction chamber, which phenomenon is detrimental to the process occurring there. In many cases, continuous regulation should be performed as low down in the reaction chamber as possible.

Shutters moved vertically give better results than those moved horizontally as regards continuity of operation and the maintenance of constant pressure, but they call for highly complex mechanisms.

The purpose of this invention is to provide a simple, reliable and accurate mechanism for regulating the removal of solid materials, whereby said removal can be effected continuously in such a way that the pressure and temperature prevailing in the reaction space is preserved as nearly constant as possible.

Another purpose is to ensure that the coarser reaction products do not remain in the chamber and that none of the reaction materials stick to the shutters and their mechanisms.

This has been achieved by means of the regulating device according to the invention, the principal characteristics of which are means for regulating the area of an outlet while keeping its height constant.

In one advantageous embodiment of the invention, the regulating device consists of strips or the like, placed parallel to and separate from one another in such a way that they move vertically. The function of these strips as a shutter regulating the removal of the material—here called "a needle dam shutter"—is based on the fact that the static pressures on the different parts of an open outlet vary greatly, and every effect should be made to increase these differences.

The great advantage of a needle dam shutter is that either a part or the whole of it can be exchanged without interrupting the process under conditions in which it would otherwise be impossible to remove the whole shutter owing to the great static pressure upon it.

Any materials stuck to the strips can easily be loosened when the strips fall against the frame of the shutter.

Practical scale tests have shown that when an ordinary regulating shutter moving vertically is replaced by one according to this invention, fluctuations in the pressure loss in the reaction chamber are eliminated.

A needle dam shutter system installed in a fluidized bed furnace intended for roasting iron sulphide is described in greater detail below, with reference to the attached drawings:

FIG. 1 is a longitudinal section of a fluidized bed furnace at the point of the shutter, seen from the front, the section being taken along the broken line 1—1 in FIG. 2.

FIG. 2 is a longitudinal section of the furnace showing the inside of the furnace as seen from the side, the section being taken along the section line 2—2 in FIG. 1.

I, II, and III in FIG. 1 are the three outlets of the furnace, 1, 2 and 3 the shutters. Each shutter is composed of separate, parallel strips or bars made of steel or some other material that withstands the prevailing conditions. In cross section the strips are square and measure 30 x 30 mm.

FIG. 2 shows the strip frame 4 within which the strips move. The frame must be dimensioned in relation to the strips so that in the gaps between the frame and the strips there is a big enough pressure loss to prevent gas leaks.

What I claim is:

1. In a fluidized bed furnace having walls with openings having generally horizontal portions therethrough, the improvement which comprises means for regulating the area of the passage at at least one of said openings while keeping the height of said passage constant, said means comprising a generally vertical closure member adapted to be positioned across a horizontal portion of said opening, said closure member being made up of a plurality of generally vertical separate parallel bars lying close to each other in a row, said bars being separately movable in the plane of the closure member, the effective area of the passage through the wall of the furnace at said opening being varied in accordance with the number of bars which are raised out of alignment with the opening, wherein the said opening is an outlet opening, and the closure member is disposed inwardly of the discharge end of the opening.

2. In a fluidized bed furnace having walls with openings having generally horizontal portions therethrough, the improvement which comprises means for regulating the area of the passage at at least one of said openings while keeping the height of said passage constant, said means comprising a generally vertical closure member adapted to be positioned across a horizontal portion of said opening, said closure member being made up of a plurality of generally vertical separate parallel bars lying close to each other in a row, said bars being separately movable in the plane of the closure member, the effective area of the passage through the wall of the furnace at said opening being varied in accordance with the number of bars which are raised out of alingment with the opening, wherein the furnace is an ore roasting furnace having a reaction chamber, and solid material is removed from the reaction chamber through said opening in the wall of the furnace.

References Cited

UNITED STATES PATENTS

| | | | |
|---|---|---|---|
| 555,856 | 3/1896 | Forter. | |
| 1,366,779 | 1/1921 | Fox | 110—173 |
| 1,885,923 | 11/1932 | Lambot | 266—10 X |
| 2,646,792 | 7/1953 | Hennig. | |
| 2,776,631 | 1/1957 | Reintjes | 126—285 X |

J. SPENCER OVERHOLSER, *Primary Examiner.*

R. S. ANNEAR, *Assistant Examiner.*